(12) United States Patent
Swami et al.

(10) Patent No.: US 12,197,744 B2
(45) Date of Patent: Jan. 14, 2025

(54) STORAGE OF CONTROL DATA INFORMATION

(71) Applicant: Western Digital Technologies, Inc., San Jose, CA (US)

(72) Inventors: Maharudra Nagnath Swami, Bangalore (IN); G K Divya, Bangalore (IN); Naveen Menezes, Bangalore (IN); Nitin Jain, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 35 days.

(21) Appl. No.: 18/447,774

(22) Filed: Aug. 10, 2023

(65) Prior Publication Data

US 2024/0192861 A1    Jun. 13, 2024

Related U.S. Application Data

(60) Provisional application No. 63/386,943, filed on Dec. 12, 2022.

(51) Int. Cl.
*G06F 3/06* (2006.01)
(52) U.S. Cl.
CPC ............ *G06F 3/0619* (2013.01); *G06F 3/064* (2013.01); *G06F 3/0679* (2013.01)
(58) Field of Classification Search
CPC ....... G06F 3/0619; G06F 3/064; G06F 3/0679
See application file for complete search history.

(56) References Cited

U.S. PATENT DOCUMENTS

| | | | |
|---|---|---|---|
| 8,040,744 B2 | 10/2011 | Gorobets et al. | |
| 8,244,960 B2 | 8/2012 | Paley et al. | |
| 9,588,691 B2 | 3/2017 | Seppanen | |
| 9,811,413 B2 | 11/2017 | Ojalvo et al. | |
| 9,811,461 B1 | 11/2017 | Fenol et al. | |
| 11,100,996 B2 | 8/2021 | Papa et al. | |
| 2016/0071608 A1* | 3/2016 | Bronner | G11C 16/3418 365/185.18 |
| 2017/0256328 A1* | 9/2017 | Ouyang | G11C 7/06 |

FOREIGN PATENT DOCUMENTS

WO    2008/045839 A1    4/2008

* cited by examiner

*Primary Examiner* — Jigar P Patel
(74) *Attorney, Agent, or Firm* — Michael Best & Friedrich LLP

(57) ABSTRACT

Methods for storing control information for memory operations within spare physical blocks. During formatting of a data storage device, spare memory blocks may be identified within memory dies and placed into a spare block pool. Upon initiation of a block exchange event for a control block, a controller determines whether a spare block is available in the spare block pool. When a spare block is available, data from the control block is copied to the spare block to generate a debug block. The control block may be a MasterIndexPage block. When a spare block is not available, the controller may erase information stored in an oldest debug memory block and copy data from the control block to the oldest debug memory block.

20 Claims, 5 Drawing Sheets

STORAGE OF CONTROL DATA INFORMATION

CROSS-REFERENCE TO RELATED APPLICATION

This application claims priority to and the benefit of U.S. Provisional Patent Application No. 63/386,943, filed on Dec. 12, 2022, the entire contents of which is incorporated herein by reference.

FIELD

This application relates generally to data storage devices and, more particularly, to storing control data information in good spare blocks.

SUMMARY

During a memory product's lifespan, various operations are performed on it. Such operations—erasing, writing, reading, formatting, etc.—can be referred to as cycling of memory. As the memory cycles, various firmware schemes are activated and executed within the product to overcome memory related issues and to ensure data integrity to a connected host device.

Memory becomes degraded over the course of its lifespan. Should the memory drive enter a bad state or encounter an error, debug information is needed to quickly correct the error. Embodiments described herein generate additional debug code in firmware to save all relevant information, and not merely only the latest control data information. For example, MasterIndexPage blocks, which holds pointers to host open blocks, may be used to store additional control data.

The disclosure provides a data storage device including, in one embodiment, a memory interface and an electronic processor. The memory interface is configured to interface with a non-volatile memory, the non-volatile memory including a plurality of memory blocks. The plurality of memory blocks includes a spare block pool of spare blocks, and at least one memory block is a control block storing control information. The electronic processor is configured to detect initiation of a control block exchange event, determine, in response to detecting the initiation of the control block exchange event, whether a spare block is available in the spare block pool, and generate a debug block by copying, in response to determining the open block is available in the spare block pool, control information from the control block to the spare block.

The disclosure also provides a method for memory block recycling. In one embodiment, the method includes detecting initiation of a control block exchange event and determining, in response to the control block exchange event, whether a spare block is available in a spare block pool. The control block exchange event is initiated when a control block is full. The method includes generating a debug block by copying, in response to determining the spare block is available in the spare block pool, control information from the control block to the spare block.

The disclosure also provides a data storage device including, in one embodiment, a memory interface and an electronic processor. The memory interface is configured to interface with a non-volatile memory, the non-volatile memory including a plurality of memory blocks. The plurality of memory blocks includes a spare block pool of spare blocks, and at least one memory block is a control block storing control information. The electronic processor is configured to identify, during a formatting operation of the non-volatile memory, a spare block, reserve, during the formatting operation of the non-volatile memory, the spare block for storing the control information from the control block, and add the spare block to the spare block pool. The electronic processor is configured to detect initiation of a control block exchange event and generate a debug block by copying, in response to the control block exchange event, the control information from the control block to the spare block in the spare block pool.

In this manner, various aspects of the disclosure provide for improvements in at least the technical fields of data storage devices and their design and architecture. The disclosure can be embodied in various forms, including hardware or circuits controlled by firmware (i.e., code executing on a processor), and computer systems and networks; as well as hardware-implemented methods, signal processing circuits, memory arrays, application specific integrated circuits, field programmable gate arrays, and the like. The foregoing summary is intended solely to give a general idea of various aspects of the disclosure, and does not limit the scope of the disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the memory device may be performed by hardware (e.g., analog or digital circuits), a combination of hardware and software (e.g., program code or firmware, stored in a non-transitory computer-readable medium, that is executed by processing or control circuitry), or any other suitable means. The following description is intended solely to give a general idea of various aspects of the disclosure, and does not limit the scope of the disclosure in any way.

Data Storage Devices

Figure 1:
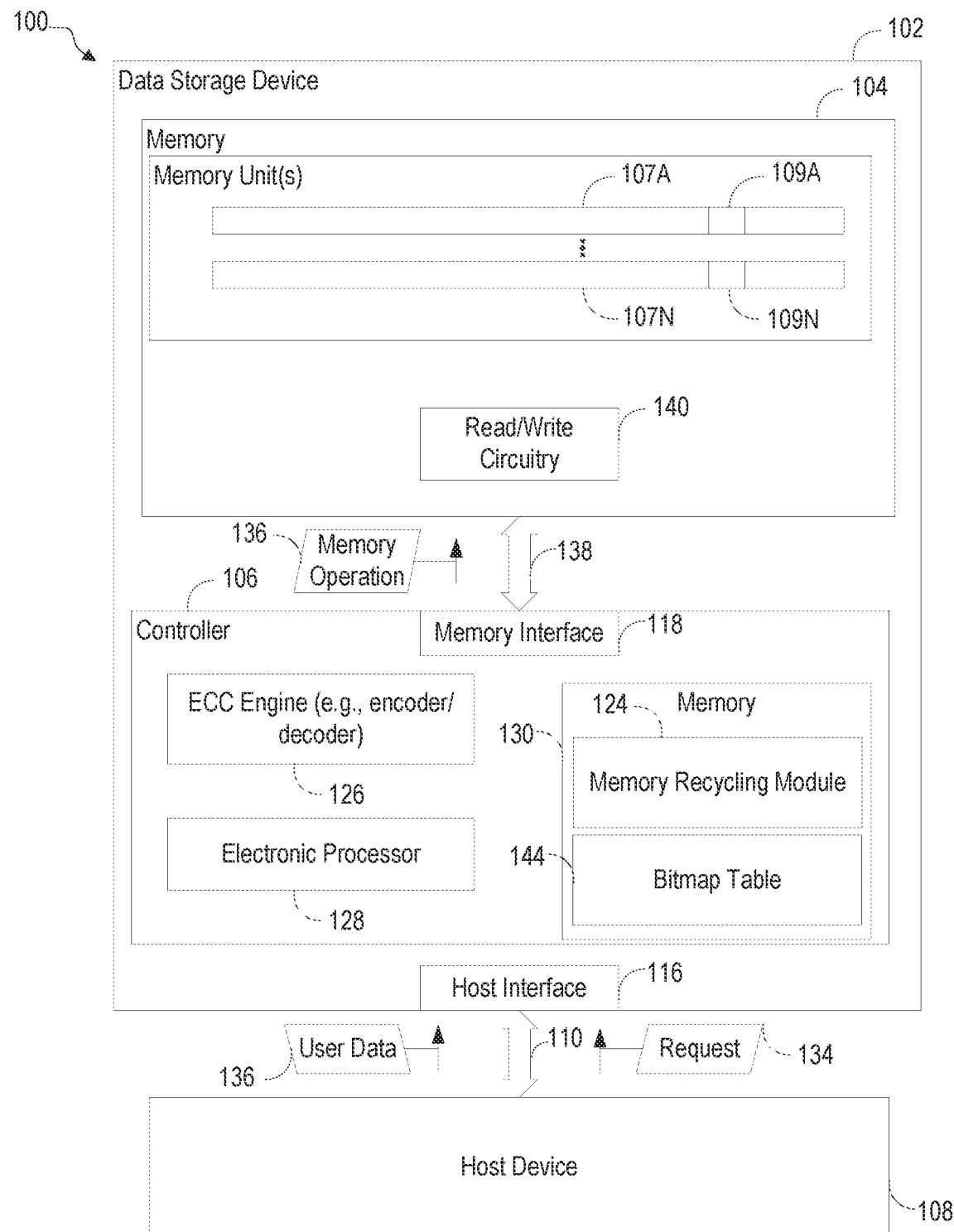
FIG. 1 is block diagram of a system including a data storage device, in accordance with some embodiments of the disclosure.

FIG. 1 is a block diagram of one example of a system 100 that includes a data storage device 102. In some implementations, the data storage device 102 is a flash memory device. For example, the data storage device 102 is a Secure Digital SD® card, a microSD® card, or another similar type of data storage device. The data storage device 102 illustrated in FIG. 1 includes a memory 104 (e.g., a non-volatile memory) and a controller 106 (referred to hereinafter as "data storage device controller") coupled to the memory 104.

The data storage device 102 is coupled to a host device 108. The host device 108 is configured to provide data 110 (for example, user data 136) to the data storage device 102 to be stored, for example, in the memory 104. The host device 108 is, for example, a smart phone, a music player, a video player, a gaming console, an e-book reader, a personal digital assistance device, a tablet, a notebook computer, or another similar device.

In some implementations, the memory 104 is NAND flash memory. The memory 104 illustrated in FIG. 1 includes a plurality of memory units 107A-107N (for example, flash memory units). Each of the plurality of memory units 107A-107N includes a plurality of storage elements. For example, in FIG. 1, the memory unit 107A includes a representative storage element 109A. In some implementations, the storage element 109 is a multi-level cell flash memory, such as a 2 levels cell ("SLC"), a 4 levels cell ("MLC"), an 8 levels cell ("TLC"), a 16 levels cell ("QLC"), or a flash memory cell having a larger number of bits per cell (for example, between five and ten bits per cell). In some implementations, the plurality of memory units 107A-107N are memory dies configured to store data. In such implementation, each storage element 109 may be a block of memory.

The data storage device controller 106 illustrated in FIG. 1 includes a host interface 116, a memory interface 118, an error code correction (ECC) engine 126, and an electronic processor or processing circuitry 128. The data storage device controller 106 is illustrated in FIG. 1 in a simplified form. One skilled in the art would recognize that a controller for a non-volatile memory would include additional modules or components other than those specifically illustrated in FIG. 1. Additionally, although the data storage device 102 is illustrated in FIG. 1 as including the data storage device controller 106 and modules for performing, for example, flag setting, in other implementations, the data storage device controller 106 is instead located within the host device 108 or is otherwise separate from the data storage device 102. As a result, flash translation layer ("FTL") operations and flash module ("FM") operations that would normally be performed by the data storage device controller 106 (for example, wear leveling, bad block management, data scrambling, garbage collection, address mapping, etc.) can be performed by the host device 108 or another device that connects to the data storage device 102.

The data storage device controller 106 is configured to send data to, and receive data and instructions from, the host device 108 with the host interface 116. The host interface 116 enables the host device 108 to, for example, read from the memory 104 by transmitting requests 134 and to write to the memory 104 by sending user data 136 and using any suitable communication protocol. Suitable communication protocols include, for example, the Universal Flash Storage ("UFS") Host Controller Interface specification, the Secure Digital ("SD") Host Controller specification, etc.

The data storage device controller 106 is also configured to send data and commands to (e.g., the user data 136, the requests 134), and receive data from, the memory 104 with the memory interface 118. As an illustrative example, the data storage device controller 106 is configured to send data and a write command to instruct the memory 104 to store data in a particular memory location in the memory 104. The data storage device controller 106 is also configured to send a read command to the memory 104 to cause a read of data from a particular memory location in the memory 104. In some examples, the data storage device controller 106 is coupled to the non-volatile memory 104 with a bus 138 in combination with the memory interface 118.

The data storage device controller 106 illustrated in FIG. 1 includes an electronic processor 128 (for example, a microprocessor, a microcontroller, a field-programmable gate array ["FPGA"] semiconductor, an application specific integrated circuit ["ASIC"], or another suitable programmable device) and a non-transitory computer readable medium or memory 130 (for example, including random access memory ["RAM"] and read only memory ["ROM"]). The electronic processor 128 is operatively connected to the various modules within the data storage device controller 106 and the data storage device 102. For example, firmware is loaded in a ROM of the memory 130 as computer executable instructions. Those computer executable instructions are capable of being retrieved from the memory 130 and executed by the electronic processor 128 to control the operation of the data storage device 102 and perform the processes described herein (for example, flag setting and read operations). In some implementations, one or more modules of the data storage device controller 106 correspond to separate hardware components within the data storage device controller 106. In other implementations, one or more modules of the data storage device controller 106 correspond to software stored within the memory 130 and executed by the electronic processor 128. The memory 130 is configured to store data used by the electronic processor 128 during operation. For example, the memory 130 stores a memory recycling module 124 and a bitmap table 144, as described below in more detail.

Memory Control Data

Proper functioning of memory devices relies on control data implemented by firmware (for example, control data implemented by the electronic processor 128). Control data is implemented to read host data, perform memory operations, recover data from a power cycle event, and the like. Memory blocks may be assigned for storing control data, such as a MasterIndexPage (MIP) block that stores pointers to host open blocks, Garbage Collection (GC) blocks which store garbage collection information, UpdateManager (UM), Group Address Table (GAT) blocks, and the like.

Control information may be dumped at regular intervals, or upon the occurrence of a particular firmware event. For example, for MIP blocks, only the last physical page in the MIP block is valid at any given time. Once the MIP block is full, a block exchange sequence is triggered. The block exchange sequence includes copying the data stored in the MIP block before releasing the MIP block into a free host block pool (e.g., a spare block pool). The free host block pool includes all blocks that are not actively storing host data or control data. A different block from the free host block pool is selected and assigned as a MIP block. Before releasing the MIP block into the free host block pool, firmware may initiate a full physical block copy sequence to copy the control data from the MIP block to a set of spare blocks identified from the spare block pool. The memory recycling module 124 may store instructions for the full physical block copy operation.

In some instances, the control data is copied onto the physical blocks which are left over due to a lack of static relink opportunities at the time of drive formatting. A bitmap table 144 may be stored in the memory 130 identifying good blocks, factory-marked bad blocks (FBB), static relinked blocks, static leftover blocks, other suitable blocks, or a combination thereof within each memory die within the memory units 107. The electronic processor 128 may scan the bitmap table 144 to identify a list of good physical blocks that are not already used to form metablocks. The electronic processor 128 then assigns the identified physical blocks for storing debug information, such as control data information. In some instances, the electronic processor 128 assigns each identified physical block to store only a particular type of control information. Such an assignment may be indicated within the bitmap table 144, thereby associating each physical block with a type of control data.

Figure 2:
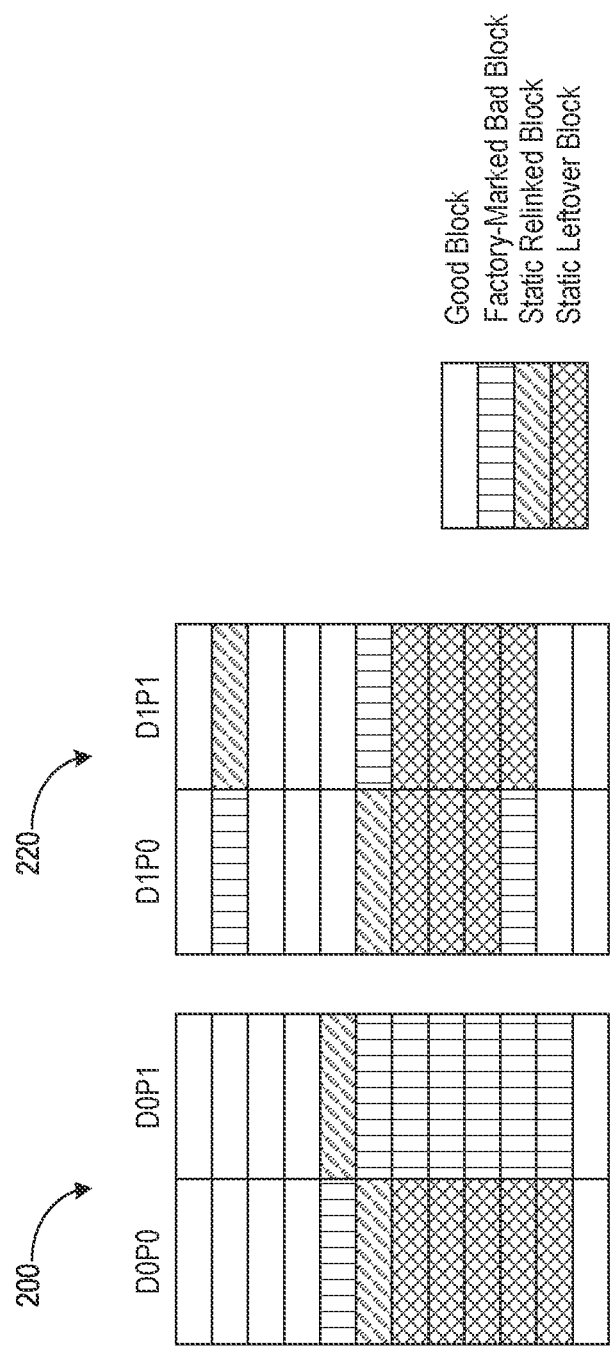
FIG. 2 is an example memory block map, in accordance with some embodiments of the disclosure.

FIG. 2 provides example physical memory dies for storing debug information. A first memory die 200 includes a first plane D0P0 (die 0 plane 0) and a second plane D0P1 (die 0 plane 1). A second memory die 220 includes a third plane D1P0 (die 1 plane 0) and a fourth plane D1P1 (die 1 plane 1). The first memory die 200 and the second memory die 220 are each comprised of a plurality of blocks configured to store data. Blocks are assigned a type during initial formatting of the data storage device 102. For example, the first memory die 200 and the second memory die 220 include good blocks, FBB, static relinked blocks, and static leftover blocks. Good blocks are memory blocks for storing host data. FBBs are blocks that are not suitable for storing data and were marked as not suitable for storing data during creation of the data storage device 102. Static relinked blocks are memory blocks linked to form a metablock, or a minimum number of memory blocks required to form a control block (such as a MIP block). The physical blocks that form a metablock may be spread across multiple memory dies. Accordingly, the static relinked blocks link each die together. Static leftover blocks are blocks that are not assigned to a particular operation and are not actively storing data. In some instances, when a block is marked as a FBB, the remaining blocks in the row are assigned as static leftover blocks (e.g., spare blocks). Additionally, blocks that are not storing host data and are not used for relinking may be assigned as spare leftover blocks.

Additionally, memory blocks may become not suitable for storing data over time due to errors (such as erase failures and programming failures). When such an instance occurs, the memory blocks may be indicated as grown bad blocks (GBBs) and are not used to store further data. Additionally, a metablock may show failure over time. However, when a metablock fails, not all physical blocks forming the metablock are bad physical blocks, and good physical blocks within the failed metablock may be added to the spare block pool.

Data Storage Device Formatting

Figure 3:
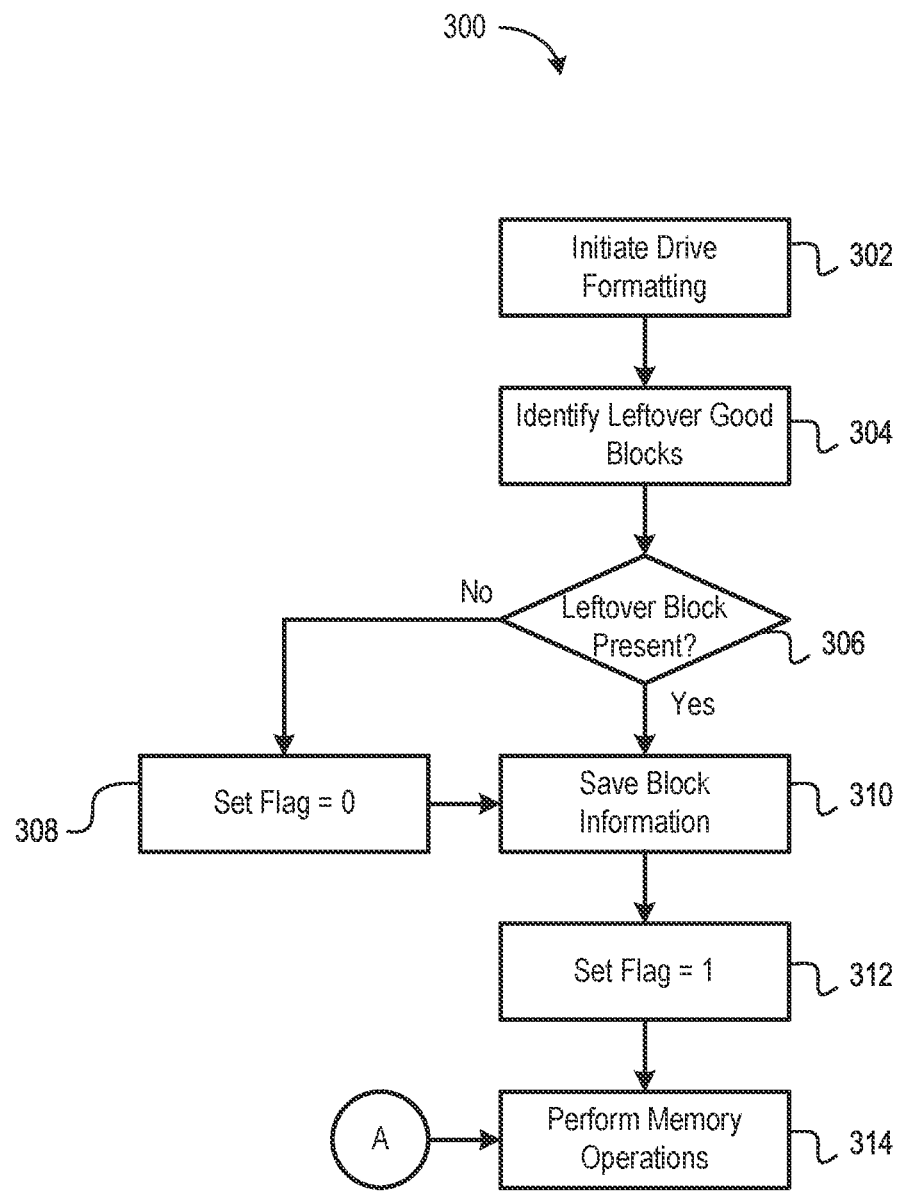
FIG. 3 is an example method of formatting a memory block, in accordance with some embodiments of the disclosure.

Blocks may be indicated as good blocks, FBB, static relinked blocks, or static leftover blocks during formatting of the data storage device 102. FIG. 3 provides a method 300 for formatting the data storage device 102. In some implementations, the method 300 is performed during initial production of the data storage device 102. However, the method 300 may be performed at other times over the lifespan of the data storage device 102.

The method 300 includes initiating, with the electronic processor 128, drive formatting (at block 302). For example, during an initial production of the data storage device 102, the memory units 107 are formatted and each memory block is assigned an initial memory block type (for example, good blocks, FBBs, etc). In some embodiments, the block type indicates a type of data the memory block is assigned to store. For example, the electronic processor 128 may reserve one or more blocks for storing control data, such as MIP control data. When a block is reserved for storing control data, the electronic processor 128 does not use the block for storing host data. In some instances, data (for example, metadata, host data) is stored in good blocks during formatting. In some implementations, drive formatting includes generating the bitmap table 144. The method 300 includes identifying, with the electronic processor 128, leftover good blocks (at block 304). Leftover good blocks (or spare good blocks) are good blocks that are not storing data after drive formatting. Leftover good blocks may be, for example, static leftover blocks.

The method 300 includes determining, with the electronic processor 128, whether any leftover good blocks are present (at decision block 306). When leftover good blocks are not present ("NO" at decision block 306), the method 300 includes setting a flag to 0 (at block 308). In some implementations, the flag is set to some other analog or digital value. The flag may be located, for example, in the bitmap table 144. In some implementations, the flag is stored in the memory recycling module 124.

When leftover good blocks are present ("YES" at decision block 306), the method 300 includes saving, with the electronic processor 128, block information (at block 310). For example, control information may be stored in the leftover good blocks. The method 300 includes setting, with the electronic processor 128, a flag to 1 (at block 312). In some implementations, the flag is set to some other analog or digital value. The flag may be located, for example, in the bitmap table 144. After the flag is set (either as 0 at block 308 or as 1 at block 312), the method 300 includes performing, with the electronic processor 128, memory operations (at block 314). Memory operations include, for example, erasing data, writing data, erasing data after writing data, writing data after erasing data, reading data, and formatting data, among other operations.

In some implementations, the assignment of a block type (during formatting at block 302) is permanent, and a block is used only for the purpose initially assigned during the lifespan of the data storage device 102. The bitmap table 144 may indicate the block type of each block. Accordingly, separate free host block pools may be kept for each block type. However, in some implementations, the block type may change when the block is recycled, described below in more detail. In such an implementation, a single free host block pool may be utilized.

Memory Block Recycling

Upon detecting an MIP block exchange event, the electronic processor 128 scans the bitmap table 144 created during the method 300 to identify the spare good blocks. The spare good blocks are used to store a copy of the MIP block. Once a minimum number of spare blocks required to store a copy of the MIP (e.g., a metablock) is identified, copy is initiated. The electronic processor 128 maintains a MIP table to record the location of MIP blocks, and implements the MIP table to retrieve control information.

Figure 4:
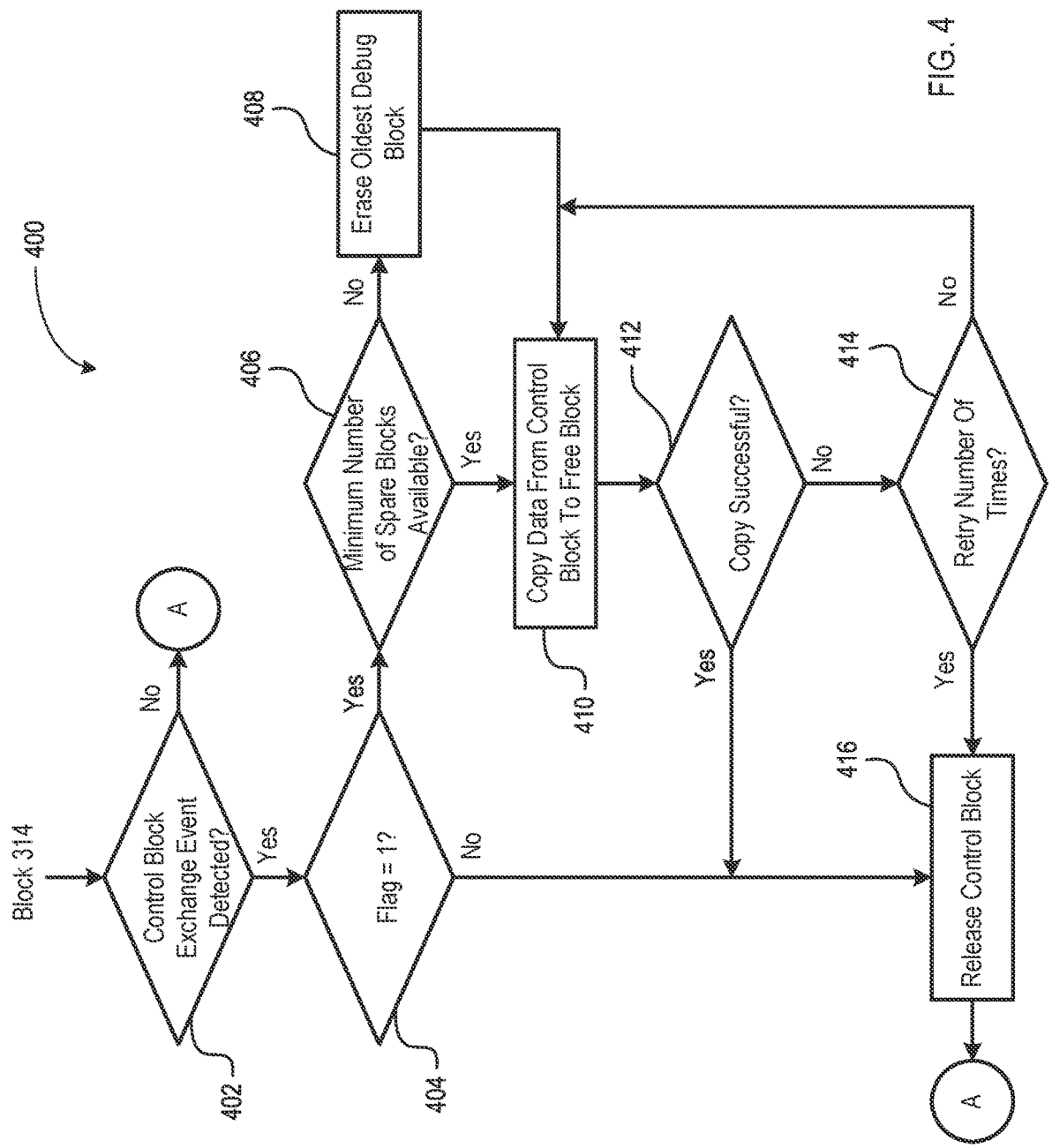
FIG. 4 is an example method of recycling memory blocks, in accordance with some embodiments of the disclosure.

As the data storage device 102 experiences memory operations (such as at block 314), the memory units 107 may run out of spare good blocks. Accordingly, embodiments described herein provide for erasing and overwriting blocks, and updating the MIP table, to continue maintaining new MIP information. FIG. 4 provides a method 400 for memory block recycling. The method 400 may be implemented by the electronic processor 128 using the memory recycling module 124. In some implementations, the method 400 begins following performing memory operations (at block 314). Performing memory operations occurs repeatedly over the lifetime of the data storage device 102.

The method 400 includes determining, with the electronic processor 128, whether a control block exchange event is detected (at decision block 402). For example, the electronic processor 128 may receive an indication that a control block, such as a MIP block, is full. When a control block exchange event is not detected ("NO" at decision block 402), the method 400 returns to block 314 and continues performing, with the electronic processor 128, memory operations.

When a control block exchange event is detected ("YES" at decision block 402), the method 400 includes determining, with the electronic processor 128, whether the flag is set to 1 (at decision block 404). When the flag is not set to 1 ("NO" at decision block 404), or is otherwise set to 0, the method 400 proceeds to release, with the electronic processor 128, the control block (at block 416). For example, when the flag is set to 0, the electronic processor 128 determines that no spare good blocks are present within memory blocks represented by the bitmap table 144. The electronic processor 128 releases the control block to add to the free host block pool. In some implementations, when releasing the control block to the free host block pool, the electronic processor 128 reserves the control block for storing control data.

When the flag is set to 1 ("YES" at decision block 404), the method 400 includes determining, with the electronic processor 128, whether a minimum number of spare good blocks are available in the free host block pool (at decision block 406). For example, the electronic processor 128 may determine, using the bitmap table 144, whether at least a metablock worth of spare good blocks are free for use. In some instances, the electronic processor 128 determines whether at least a metablock worth of spare good blocks reserved for storing control data are free for use. When a minimum number of spare good blocks are free ("YES" at decision block 406), the method 400 includes copying, with the electronic processor 128, data from the control block to the spare free blocks (at block 410). Copying the data from the control block to the free blocks creates a copy of the control block for use during debugging operations or error recovery operations (e.g., creates a debug block).

When a minimum number of physical memory blocks are not free ("NO" at decision block 406), the method 400 includes erasing, with the electronic processor 128, the oldest debug block. For example, the electronic processor 128 refers to the bitmap table 144 to determine the oldest block storing debugging information. In some instances, each debug block includes a timestamp indicating when the control information was stored in the respective debug block. The electronic processor 128 refers to the timestamps to determine the oldest block storing debugging information. The contents of the oldest block are erased, and the block is added to the free host block pool. Once the oldest block is erased, the method 400 continues to block 410 and copies, with the electronic processor 128, data from the control block to free blocks in the free host block pool.

The method 400 includes determining, with the electronic processor 128, whether the copy operation was successful (at decision block 412). When the copy operation is successful ("YES" at decision block 412), the method 400 includes releasing, with the electronic processor 128, the previous control block into the free host block pool (at block 416). Accordingly, the control block may be recycled for future use. When the copy operation is not successful ("NO" at decision block 412), the method 400 includes determining, with the electronic processor 128, whether the copy operation has been attempted a predetermined number of times (at decision block 414). When the copy operation has not been attempted a predetermined number of tries ("NO" at decision block 414), the method 400 returns to block 410 and re-attempts, with the electronic processor 128, the copy operation. When the copy operation has been attempted a predetermined number of tries ("YES" at decision block 414), the method 400 continues to block 416 and releases, with the electronic processor 128, the control block. Accordingly, the electronic processor 128 will continue to release the control block after continued failure of the copy operation.

In some instances, a counter is implemented to track the number of copy attempts. In such an instance, the electronic processor 128 compares the counter to a threshold at decision block 414. When the copy operation is not successful ("NO" at decision block 412), the electronic processor 128 increases the counter. When the copy operation is successful, or the counter increases above the threshold ("YES" at decision block 412 or "YES" at decision block 414), the electronic processor 128 clears the counter.

Control Block Relinking

Additionally, spare blocks may be used for the relinking of blocks upon occurrence of a program failure or erase failure. For example, the physical blocks that form a metablock may be spread across multiple memory dies. Linked blocks are memory blocks that point to another plane or another die of memory, providing a means of identifying which physical blocks form a metablock. Program failures and erase failures may corrupt a linked block. Accordingly, spare blocks may be used to "relink" memory planes or memory dies. Should the memory 104 run out of spare blocks due to storing of debug information, the oldest block storing debug information may be released and instead used for relinking.

Figure 5:
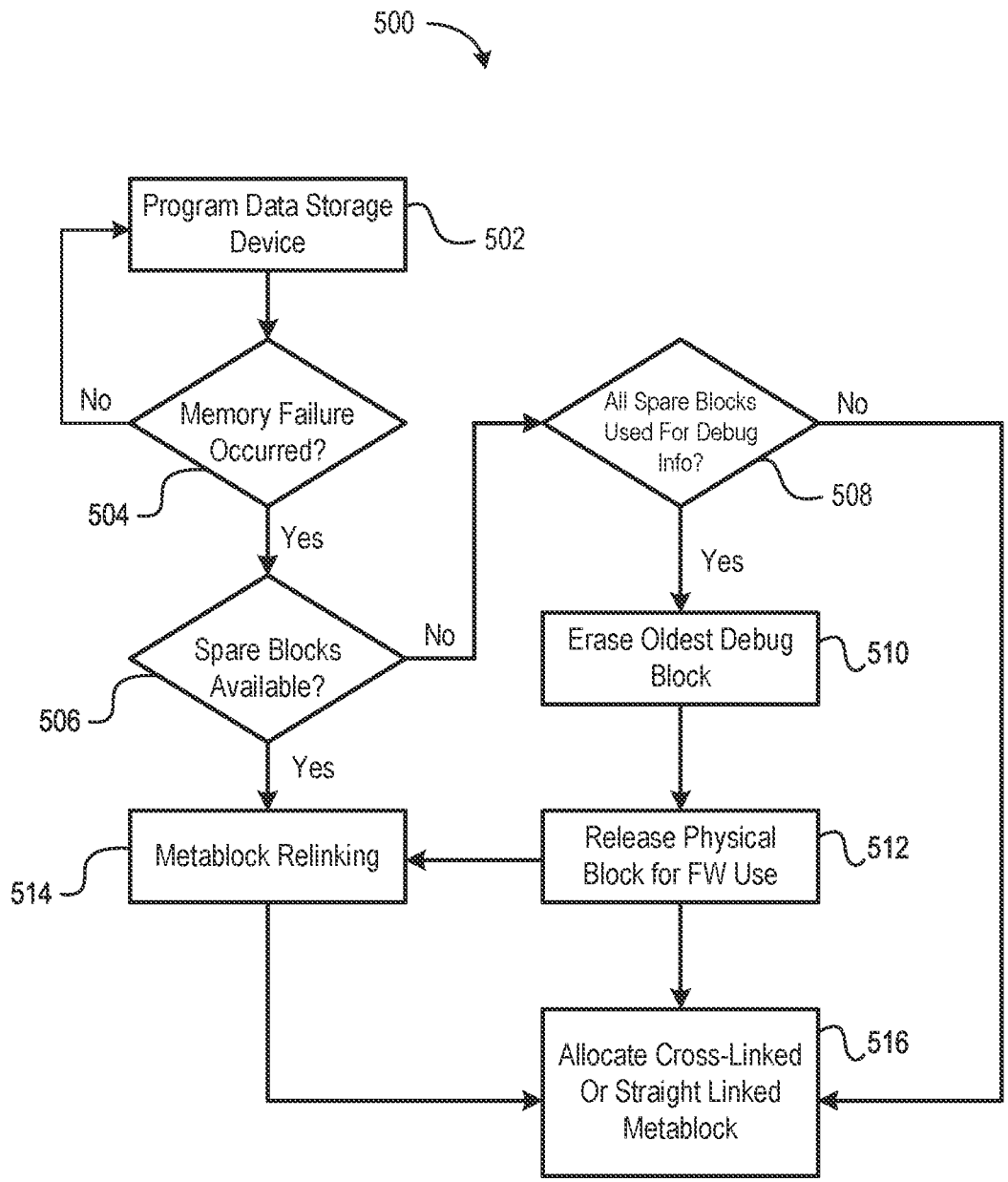
FIG. 5 is an example method of linking memory blocks, in accordance with some embodiments of the disclosure.

FIG. 5 provides a method 500 for memory block recycling. Method 500 may occur at any point during the lifetime of the data storage device 102. The method 500 includes programming, with the electronic processor 128, the data storage device 102 (at block 502). Programming the data storage device 102 may include storing host data in the memory 104, performing control operations, performing the method 400, and the like.

The method 500 includes determining, with the electronic processor 128, whether a memory failure has occurred (at decision block 504). For example, the electronic processor 128 may determine whether a programming failure has occurred during a host write event, determine whether an erase failure has occurred while erasing data from a block, and the like. When a memory failure has not occurred ("NO" at decision block 504), the method 500 returns to block 502 and continues programming, with the electronic processor 128, the data storage device 102.

When a memory failure has occurred ("YES" at decision block 506), the method 500 includes determining, with the electronic processor 128, whether spare blocks are available (at decision block 506). For example, the electronic processor 128 may refer to the bitmap table 144 to determine whether any spare blocks are present. When no spare blocks are available ("NO" at decision block 506), the method 500 includes determining, with the electronic processor 128, whether all spare blocks are being used for storing debugging information (for example, being used for storing control information from method 400) (at decision block 508). When all spare blocks are not being used for storing debugging information ("NO" at decision block 508), and therefore at least one block is available for metablock relinking, the method 500 includes allocating, with the electronic processor 128, a spare block for metablock relinking (e.g., straight-linking or cross-linking) (at block 516). When all spare blocks are being used for storing debugging information ("YES" at decision block 508), the method 500 includes erasing, with the electronic processor 128, the oldest debug block (at block 510). For example, in some instances, each debug block includes a timestamp indicating when the control information was stored in the respective debug block. The electronic processor 128 refers to the timestamp to determine the oldest debug block.

The method 500 includes releasing, with the electronic processor 128, the oldest debug block for firmware use (at block 512). For example, the physical block that previously held control information is released into the free host block pool. The method 500 includes relinking, with the electronic processor 128, metablocks using a block from the free host block pool (at block 514). In this manner, the electronic processor 128 assigns the linking performed by the failed block to a new memory block. The method 500 includes allocating, with the electronic processor 128, the spare block for metablock relinking (e.g., cross-linking or straight-linking) (at block 516).

Accordingly, embodiments described herein provide for maintaining a history of control data (for example, a MIP record) from which processing activity such as hot count operations, garbage collection operations, update manager operations, and group address table activity is readily available for failure investigation and recovery.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
   a memory interface configured to interface with a non-volatile memory, the non-volatile memory including a plurality of memory blocks, wherein the plurality of memory blocks includes a spare block pool of spare blocks and a control block storing control information; and
   an electronic processor configured to:
      detect initiation of a control block exchange event,
      determine, in response to detecting the initiation of the control block exchange event, whether a spare block is available in the spare block pool, and
      generate a debug block by copying, in response to determining the spare block is available in the spare block pool, the control information from the control block to the spare block.

2. The data storage device of claim 1, wherein the electronic processor is further configured to:
   reserve the spare block for storing the control information from the control block.

3. The data storage device of claim 1, wherein the electronic processor is further configured to:
   determine, after a formatting operation of the data storage device, whether spare blocks are present within the non-volatile memory,
   set, based on whether spare blocks are present within the non-volatile memory, a flag, and
   add the spare blocks to the spare block pool.

4. The data storage device of claim 3, wherein the electronic processor is configured to determine, in response to detecting the initiation of the block exchange event, whether the spare block is available in the spare block pool based on the flag that is set and associated with the spare block.

5. The data storage device of claim 1, wherein the electronic processor is configured to:
   erase data stored in an oldest debug memory block, and
   generate a second debug block by copying the control information from the control block to the oldest debug memory block.

6. The data storage device of claim 5, wherein the electronic processor is configured to:
   determine the oldest debug memory block based on a timestamp associated with the oldest debug memory block.

7. The data storage device of claim 1, wherein the electronic processor is configured to:
   determine, in response to detecting the initiation of the control block exchange event, whether a minimum number of spare blocks are available in the spare block pool, and
   generate a plurality of debug blocks by copying, in response to determining the minimum number of spare blocks are available in the spare block pool, the control information from the control block to the minimum number of spare blocks.

8. The data storage device of claim 1, wherein the electronic processor is configured to:
   detect a memory failure event;

determine, in response to detecting the memory failure event, whether the spare block is available in the spare block pool; and link, in response to determining the spare block is available, the spare block to another memory block included in the plurality of memory blocks.

9. The data storage device of claim 8, wherein the electronic processor is configured to:

erase data stored in an oldest debug memory block, and add the oldest debug memory block that is erased to the spare block pool.

10. In a Solid State memory device including memory cells and a controller in communication with the memory cells, a method for memory block recycling, the method comprising:

detecting, by the controller, initiation of a control block exchange event, wherein the control block exchange event is initiated when a control block is full;

determining, when the control block is full, whether a spare block is available in a spare block pool; and generating a debug block by copying, in response to determining the spare block is available in the spare block pool, control information from the control block to the spare block.

11. The method of claim 10, further comprising:

determining, after a formatting operation of a non-volatile memory, whether spare blocks are present within the non-volatile memory, setting, based on whether spare blocks are present within the non-volatile memory, a flag, and add the spare blocks to the spare block pool.

12. The method of claim 11, further comprising:

determining, in response to the initiation of the block exchange event, whether the spare block is available in the spare block pool based on the flag that is set and associated with the spare block.

13. The method of claim 10, further comprising:

erasing data stored in an oldest debug memory block, and generating a second debug block by copying the control information from the control block to the oldest debug memory block.

14. The method of claim 13, further comprising:

determining the oldest debug memory block based on a timestamp associated with the oldest memory block.

15. The method of claim 10, further comprising:

determining, in response to detecting the initiation of the control block exchange event, whether a minimum number of spare blocks are available in the spare block pool, and generating a plurality of debug blocks by copying, in response to determining the minimum number of spare blocks are available in the spare block pool, the control information from the control block to the minimum number of spare blocks.

16. The method of claim 10, further comprising:

detecting a memory failure event;

determining, in response to detecting the memory failure event, whether the spare block is available in the spare block pool; and linking, in response to determining the spare block is available, the spare block to another memory block included in a non-volatile memory.

17. The method of claim 10, further comprising:

erasing data stored in an oldest debug memory block, and adding the oldest debug memory block that is erased to the spare block pool.

18. A data storage device, comprising:

a memory interface configured to interface with a non-volatile memory, the non-volatile memory including a plurality of memory blocks, wherein the plurality of memory blocks includes a spare block pool of spare blocks, and wherein at least one memory block is a control block storing control information; and an electronic processor configured to:

identify, during a formatting operation of the non-volatile memory, a spare block, reserve, during the formatting operation of the non-volatile memory, the spare block for storing the control information from the control block, add the spare block to the spare block pool, detect initiation of a control block exchange event, and generate a debug block by copying, in response to the control block exchange event, the control information from the control block to the spare block in the spare block pool.

19. The data storage device of claim 18, wherein the electronic processor is further configured to:

erase, when the spare block pool is empty, data stored in an oldest debug memory block, and generate a second debug block by copying the control information from the control block to the oldest debug memory block.

20. The data storage device of claim 18, wherein the electronic processor is configured to:

erase, when the spare block pool is empty and a memory failure event is detected, data stored in an oldest debug memory block, and add the oldest debug memory block that is erased to the spare block pool.

* * * * *